US010573279B2

(12) United States Patent
Wyman et al.

(10) Patent No.: US 10,573,279 B2
(45) Date of Patent: Feb. 25, 2020

(54) SYSTEMS AND METHODS FOR COMBINING VIDEO AND GRAPHIC SOURCES FOR DISPLAY

(71) Applicant: Avago Technologies International Sales Pte. Limited, Singapore (SG)

(72) Inventors: Richard Wyman, Santa Clara, CA (US); David Wu, San Diego, CA (US); Jason Herrick, Santa Clara, CA (US)

(73) Assignee: Avago Technologies International Sales Pte. Limited, Singapore (SG)

(*) Notice: Subject to any disclaimer, the term of this patent is extended or adjusted under 35 U.S.C. 154(b) by 0 days.

(21) Appl. No.: 15/793,791

(22) Filed: Oct. 25, 2017

(65) Prior Publication Data

US 2019/0080674 A1 Mar. 14, 2019

Related U.S. Application Data

(60) Provisional application No. 62/556,300, filed on Sep. 8, 2017.

(51) Int. Cl.
| H04N 9/76 | (2006.01) |
| G09G 5/397 | (2006.01) |
| H04N 5/45 | (2011.01) |
| H04N 21/431 | (2011.01) |
| H04N 21/462 | (2011.01) |
| H04N 21/4402 | (2011.01) |
| H04N 9/64 | (2006.01) |
| H04N 21/426 | (2011.01) |

(Continued)

(52) U.S. Cl.
CPC ............ *G09G 5/397* (2013.01); *H04N 5/265* (2013.01); *H04N 5/45* (2013.01); *H04N 9/642* (2013.01); *H04N 9/76* (2013.01); *H04N 21/2343* (2013.01); *H04N 21/2665* (2013.01); *H04N 21/42653* (2013.01); *H04N 21/4316* (2013.01); *H04N 21/4402* (2013.01); *H04N 21/4622* (2013.01); *H04N 21/8146* (2013.01); *G09G 2340/125* (2013.01)

(58) Field of Classification Search
CPC .. G09G 5/395; G09G 5/37; G09G 2320/0252; G06T 1/20
See application file for complete search history.

(56) References Cited

U.S. PATENT DOCUMENTS

| 2005/0024384 A1* | 2/2005 | Evans ............ G09G 5/363 345/604 |
| 2016/0080716 A1 | 3/2016 | Atkins et al. |
| 2016/0365065 A1 | 12/2016 | Wu et al. |

OTHER PUBLICATIONS

Office Action for German Patent Application No. DE102018001836.6 dated Oct. 30, 2018, 8 pages.

* cited by examiner

*Primary Examiner* — Nicholas R Wilson
(74) *Attorney, Agent, or Firm* — Foley & Lardner LLP

(57) ABSTRACT

Systems and methods are provided for combining a plurality of streams with a plurality of formats into a single output stream in a predetermined output format. Each of the plurality of streams includes at least one of video or graphics. Each stream is processed by determining a format of the stream, determining whether the format is compatible with the predetermined output format, and responsive to determining that the format is compatible with the predetermined output format, converting the format to the predetermined output format. The processed plurality of streams are combined into a single output stream in the predetermined output format.

26 Claims, 3 Drawing Sheets

(51) Int. Cl.
*H04N 21/81* (2011.01)
*H04N 5/265* (2006.01)
*H04N 21/2343* (2011.01)
*H04N 21/2665* (2011.01)

SYSTEMS AND METHODS FOR COMBINING VIDEO AND GRAPHIC SOURCES FOR DISPLAY

CROSS REFERENCE TO RELATED APPLICATIONS

This application claims priority to and the benefit of U.S. Provisional Application No. 62/556,300, filed Sep. 8, 2017, entitled "SYSTEMS AND METHODS FOR COMBINING VIDEO AND GRAPHIC SOURCES FOR DISPLAY", assigned to the assignee of this application, and which is incorporated herein by reference in its entirety for all purposes.

FIELD OF THE DISCLOSURE

This disclosure generally relates to systems and methods for combining video and graphics, including but not limited to systems and methods for combining multiple high dynamic range and standard dynamic range video and graphic sources that utilized wide and/or standard gamut onto a single video signal for display.

BACKGROUND OF THE DISCLOSURE

Blending or combining video and graphics is becoming increasingly difficult as the formats for video and graphics become increasingly complex and diverse. Methods to accomplish blending of video and graphics can become time consuming and require additional processing resources. As the demand for more complex video continues to increase, the blending graphics for display may present increasing challenges.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

Before turning to the figures, which illustrate the example embodiments in detail, it should be understood that the application is not limited to the details or methodology set forth in the description or illustrated in the figures. It should also be understood that the terminology is for the purpose of description only and should not be regarded as limiting.

Some conventional video processing systems can receive multiple video streams and graphics and merge the received video and graphics together on a same display. The merge is performed using alpha blending where multiple sources are blended together on a pixel by pixel basis. Since a single output format must be targeted, the input sources that do not match this format are converted. Traditionally, this is done with some linear matrix processing. This works reasonably well when the only difference between the input formats is due to a colorspace difference and when the colorspaces are fairly similar. When the difference between the input formats and the output formats are more complex, it is desirable to convert the input formats to a desired output format.

Referring generally to the figures, systems and methods are provided for combining multiple sources (e.g., high dynamic range and standard dynamic range video and graphic sources that utilize wide and/or standard gamut) onto a single video signal for display. The systems and methods of the present disclosure address the challenge of combining input video and graphics with different source formats by utilizing a format converter before combining the video and graphics. Utilizing the systems and methods of the present disclosure, in some implementations, a variety of incompatible formats can be merged together into a single output stream, regardless of whether the input formats are compatible with one another or with the output stream format.

Figure 1:
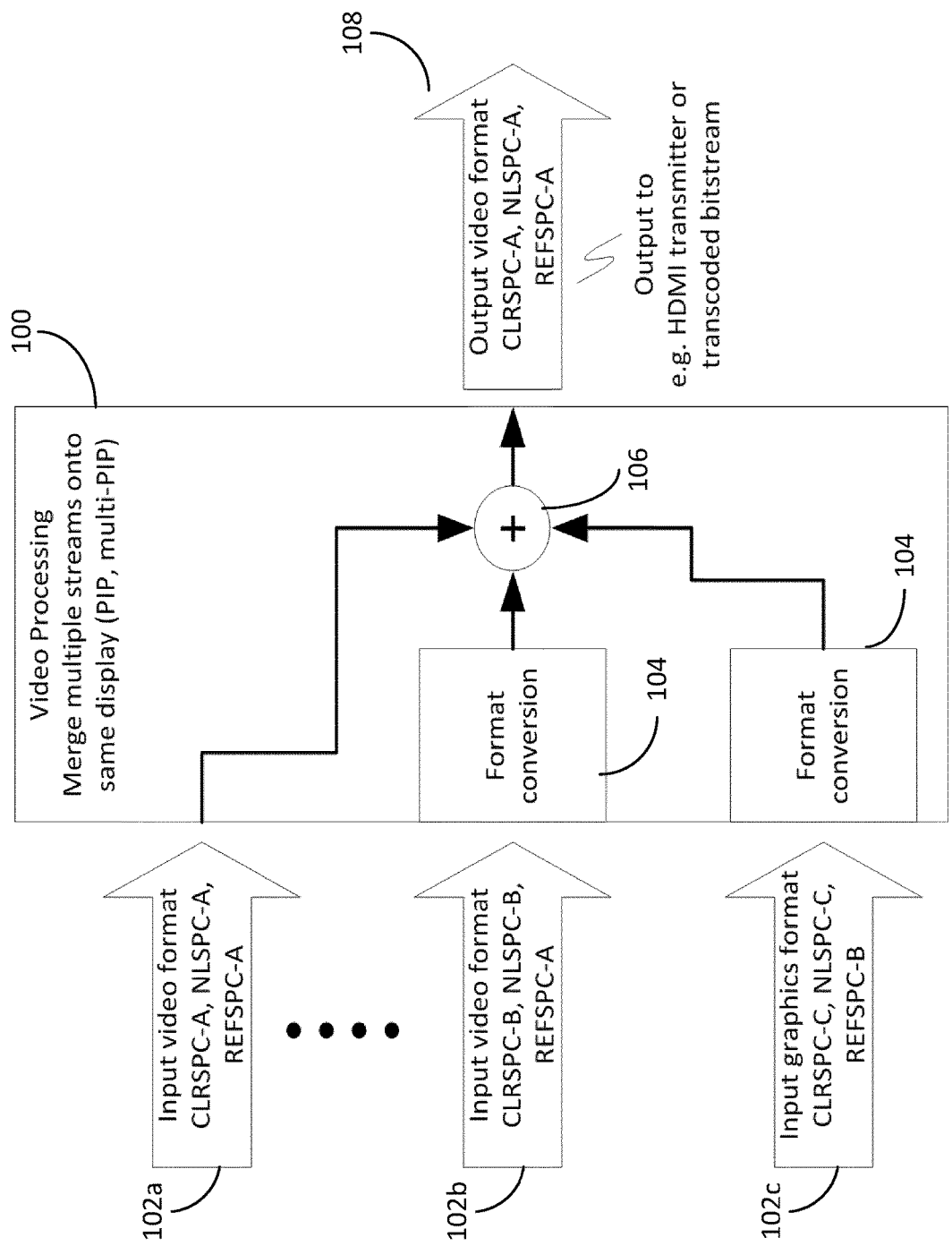
FIG. 1 is a diagram of a video processing system according to an illustrative embodiment.

Referring to FIG. 1, a diagram of a video processing system 100 is depicted according to an illustrative embodiment. The video processing system 100 is configured to merge multiple streams into a same output stream for display. In some embodiments, the multiple streams are received from different video or graphics resources and/or in different video or graphic formats. For example, in the illustrated embodiment, the video processing system 100 receives an input video 102a associated with video formats CLRSPC-A, NLSPC-A, and REFSPC-A, an input video 102b associated with video formats CLRSPC-B, NLSPC-B, and REFSPC-A, and input graphics 102c associated with video formats CLRSPC-C, NLSPC-C, and REFSPC-B. The video processing system 100 includes one or more format converters 104 configured to convert formats of input videos and graphics to a desired format. The desired format is determined by a downstream output format for display. For example, as shown in FIG. 1, the output format is a video format including CLRSPC-A, NLSPC-A, and REFSPC-A. The input streams can include any combination of formats. The formats of the input streams are independent of the required output format, i.e., aspects of the input format can be incompatible with aspects of the output format.

The video processing system 100 determines whether each of the input video and graphics streams has a format that is compatible with the desired output format. For any video and graphics streams that do not have a format compatible to the desired output format, the video processing system 100 uses the format converter 104 to convert the incompatible formats to the desired output format. For example, for the video stream 102b and graphics stream 102c, the video processing system 100 converts each of the streams 102b and 102c from its source formats (i.e., CLRSPC-B, NLSPC-B, and REFSPC-A, CLRSPC-C, NLSPC-C, and REFSPC-B) to the output video format (i.e., CLRSPC-A, NLSPC-A, and REFSPC-A).

The video processing system 100 further includes a combiner 106 configured to combine the converted video and graphics streams to generate a single stream output 108 with a format that is compatible with the desired output video format. The combiner 106 is configured to merge the converted video and graphics streams together to create a single output 108. In some embodiments, the combiner 106 uses alpha blending where multiple sources are blended together on a pixel by pixel basis. The output stream 108 can have an output format chosen to allow for picture-in-picture (PIP), multi-window PIP, picture in graphics, etc. In some such embodiments, each of the streams may be used to generate separate portions of the output image (e.g., separate PIP portions). The output format does not need to match the input formats of the video and graphics streams. In some embodiments, the output stream is displayed in multiple windows which overlap each other on the screen. In some such embodiments, the output stream is made to occlude or be alpha blended where they overlap.

Figure 2:
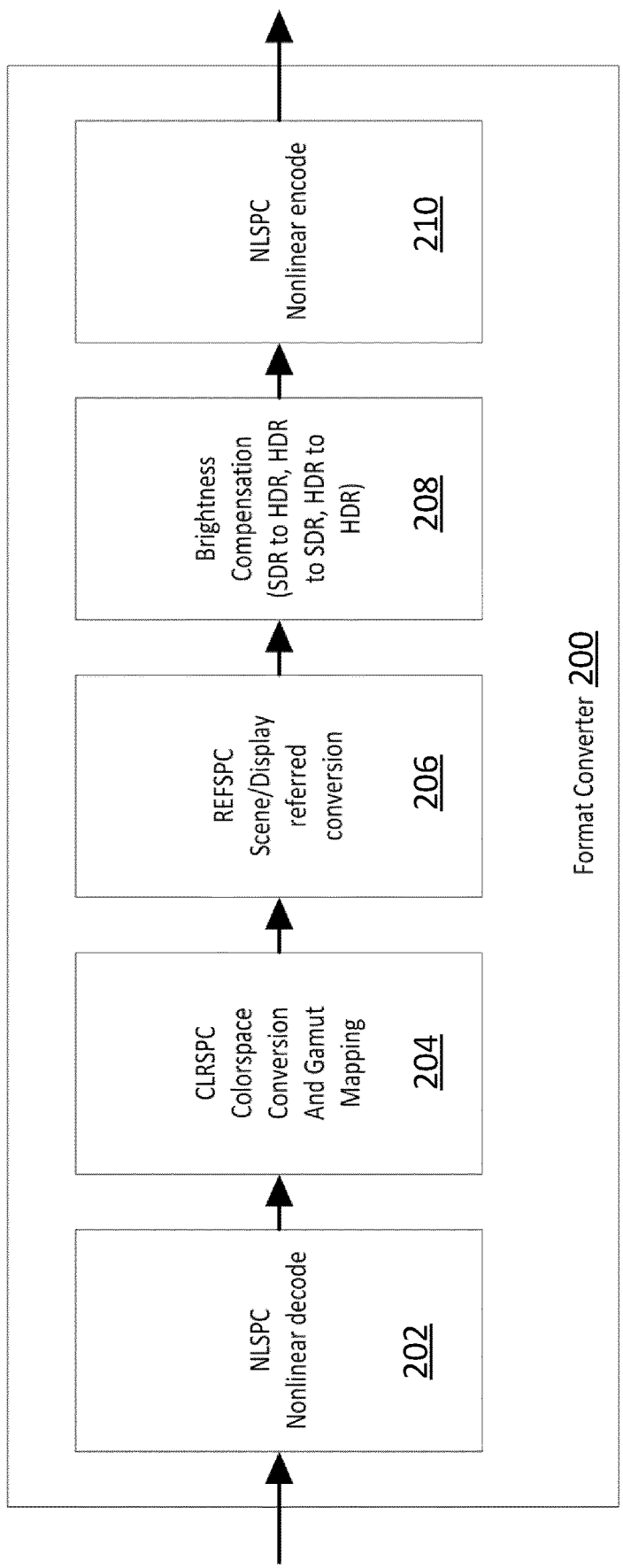
FIG. 2 a diagram of a format converter of a video processing system according to an illustrative embodiment.

Referring to FIG. 2, a diagram of format converter 200 of a video processing system is depicted according to an illustrative embodiment. In some embodiments, the format converter 200 can be used as the format converter for a video processing system such as the video processing system 100 as shown in FIG. 1. A format of graphical assets is defined by multiple parameters, including, but not limited to, color space, nonlinear space, and light source according to one or more embodiments.

TABLE 1

Parameters used to define a video/graphics format

| Graphics/Video Format Parameter | Description | Examples defined in |
|---|---|---|
| CLRSPC | Colorspace (chromaticities) defining particular R, G, B primaries and white point (temperature of white given equal amounts of R, G, B). | sRGB ITU-R BT.601 ITU-R BT.709 ITU-R BT.2020 ITU-R BT.2100 D65 (6500K whitepoint) |
| NLSPC | Nonlinear Signal Transformation for Efficient Encoding of Signals | sRGB ITU-R BT.709 ITU-R BT.1886 ITU-R BT.2100 SMPTE ST.2084 |
| REFSPC | System assumption of whether signal encodes light received by camera or light emitted by display | Scene Referred Display Referred ITU-R BT.2100 |

Table 1 shows some parameters used to define a particular video or graphic format and examples of standards that define the particular values used for each parameter according to example embodiments. These parameters are implicated any kinds of format standards such as standard or high dynamic range, standard or wide gamut, peak white brightness and minimum black brightness, etc.

The format converter 200 is configured to receive a bitstream from a source including video and graphics in source formats and convert the video and graphics from the source formats to a desired format. The desired format is selected based on downstream format for display. In some embodiments, source formats of the video and graphics are indicated by the header of the bitstream. In some embodiments, the source formats are determined using sideband signaling over wired communication (e.g., HDMI) wherein the source and the output (e.g., display) negotiates and agrees on a source format. In some embodiments, the source formats are built into a standard (e.g., the National Television System Committee (NTSC) composites input that has predefined and fixed colorspace, nonlinear space, and reference space). In some embodiments, the source formats are in standard formats (e.g., in sRGB format for JPEGs as defined by the standard). In some embodiment, each source format specifies parameters including color space (CLRSPC), nonlinear space (NLSPC), and reference space (REFSPC). In some embodiments, the bitstream header or HDMI sideband information specify each parameter independently. In some embodiments, the REFSPC is specified based on the choice of NLSPC. In some embodiments, source formats of the graphics are decided by the creator of those graphics. For example, a set of fonts or graphical textures (used for adding texture to 3D renderings) can be created in a particular format. In some embodiments, the source formats decided by the creator are indicated as part of a package set.

The format converter 200 includes multiple circuits configured to implement portions of the conversion process. In the illustrated embodiment, the circuits include an NLSPC decode circuit 202, a CLRSPC conversion and gamut mapping circuit 204, a REFSPC scene/display referred conversion circuit 206, a brightness compensation circuit 208, and a NLSPC encode circuit 210. In other embodiments, it should be understood that fewer, additional, or different circuits could be used. In various embodiments, the circuits may be implemented using hardware (e.g., integrated circuits), software (e.g., instructions stored in a memory executable by a processor), or a combination of the two. These circuits are shown in an order in FIG. 2, but the order of the circuits can be reordered according to one or more embodiments. For circuits of the format converter 200 that are configured to perform nonlinear decoding or encoding, the format converter 200 can bypass these circuits when processing linear decoded and/or encoded assets. Similarly, for circuits of the format converter 200 that are configured to process linear input or generate linear output, in some embodiments, the format converter 200 bypasses these modules when processing a nonlinear decoded and/or encoded assets.

The nonlinear space (NLSPC) decode circuit 202 is configured to nonlinearly transform the input assets when the input assets are nonlinear encoded. In some embodiments, the NLSPC decode circuit 202 implements any suitable algorithms (e.g., mathematical functions, lookup table, or piecewise-linear (PWL) approximations) for converting the input asset from nonlinear space to linear space. The input assets are represented more accurately in linear light, so that the NLSPC decode circuit 202 enables the format converter 200 to convert the assets more accurately in the subsequent operations (e.g., operations performed by the circuits 204, 206, and 208). The colorspace (CLRSPC) conversion and gamut mapping circuit 204 is configured to map the decoded assets from a source colorspace and gamut to a colorspace and gamut of the output format. The colorspace and gamut mapping includes changing the red, green, and blue primaries and white-point values (temperature of white given equal amounts of red, green, and blue) values of decoded assets to primary and white point values of the output format. In some embodiments, the primaries and white-point values are indicated by the source formats, and by knowing the input and output formats, the system can determine the input and output primaries and white-point values.

The REFSPC scene/display referred conversion circuit 206 is configured to determine light sources based on which the source formats of the input assets are defined (e.g., light received from camera, light emitted by display) according to one or more embodiments. The REFSPC scene/display referred conversion circuit 206 determines a light source of the output format. In some embodiments, input formats are defined based on light sources. The REFSPC scene/display referred conversion circuit 206 converts the light sources of the input assets to the light source of the output format. For example, if the input assets are recorded from an outdoor scene with a camera with some peak brightness that are out of a range within which a television can display. The REFSPC scene/display referred conversion circuit 206 linearly scales the peak brightness of the outdoor scene to a peak brightness of the television and adjust the assets by adding contrast to the assets according to the viewing environment. In some embodiments, the scene/display referred conversion circuit 206 uses an optical to optical transfer function (OOTF) to adjust the contrast to the linearly scaled assets. One example of an OOTF is a gamma adjustment as shown below:

$$Light_{display} = scale\_factor \times Light_{scene}^\gamma$$

In some embodiments, the input assets are encoded with display light such that the brightness range of the input assets can be displayed on a display device (e.g., television). In some such embodiments, the REFSPC scene/display referred conversion circuit 206 is bypassed. In some embodiments, when the input assets and the output assets have the same REFSPC, the REFSPC scene/display referred conversion circuit 206 is bypassed. In some embodiments, when the input assets are scene referred and the output requires display referred, the REFSPC scene/display referred conversion circuit 206 performs OOTF adjustment. In some embodiments, when the input assets are display referred and the output requires scene referred, the REFSPC scene/display referred conversion circuit 206 performs an inverse OOTF. The brightness compensation circuit 208 is configured to adjust the brightness of the decoded assets from source brightness to the brightness of the required output format. For example, when the converter 200 processes SDR to HDR conversion, the converter 200 boosts the brightness of the displayed signal so that it does not look unnaturally dark compared to HDR sources. When the converter 200 processes HDR to SDR conversion, the converter 200, the SDR signal cannot go as bright or as dark as the HDR source. In this case, the converter maps the signals that are out of range into the available range of the available SDR output signal. The NLSPC nonlinear encode circuit 210 is configured to nonlinearly encode the converted assets to generate a nonlinear output. The output of the format converter 200 is compatible with the required output format. The input of the format converter 200 can be any formats compatible or incompatible to the required output format according to one or more embodiments. According to some embodiments, the format converter 200 is bypassed by the video processing system if the input video and graphics of the video processing system have a format that is compatible with the required output format.

Figure 3:
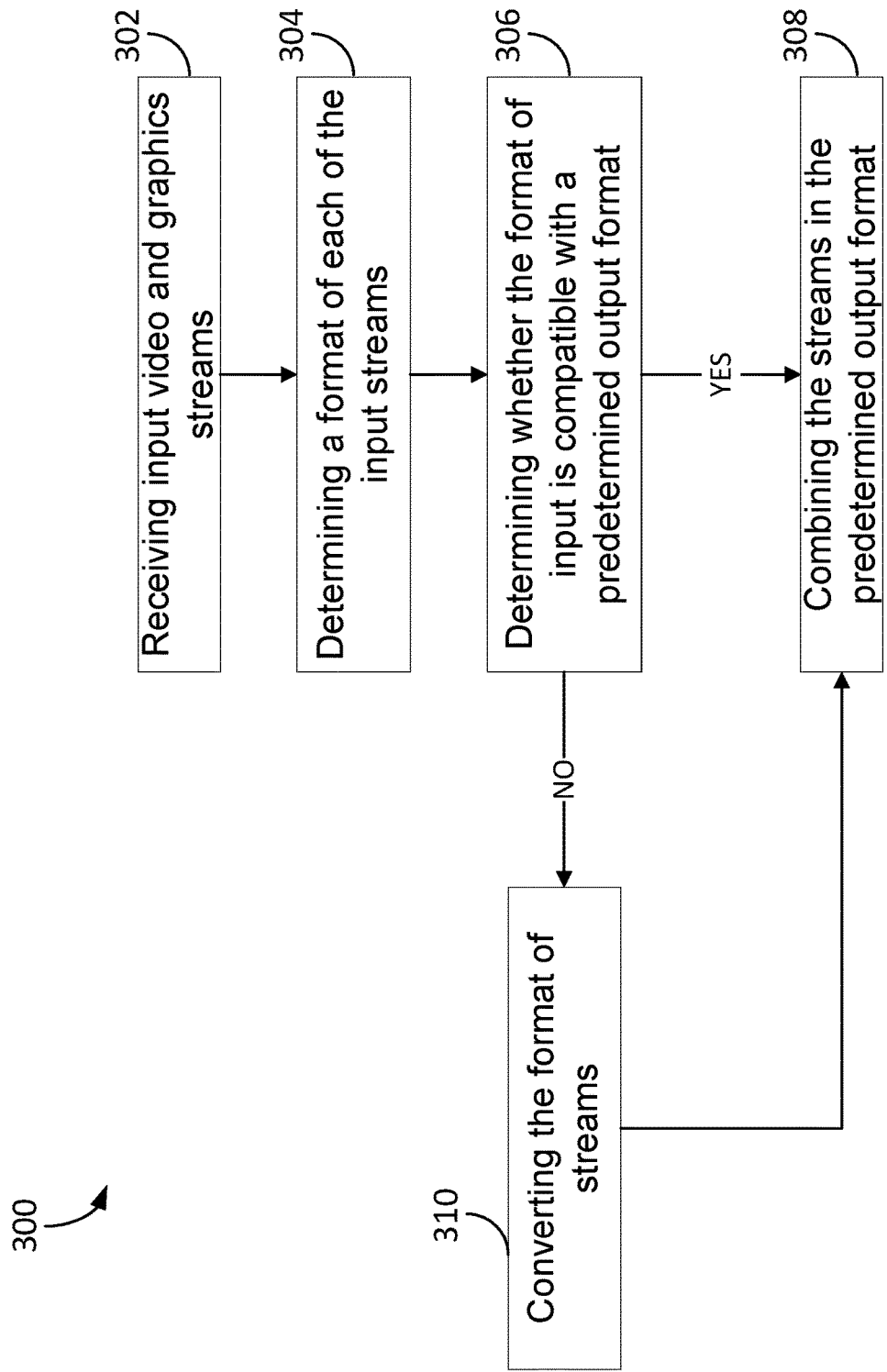
FIG. 3 a flow chart of a process of combining video and graphics streams according to an illustrative embodiment.

Referring to FIG. 3, a flow chart of a process 300 of combining video and graphics streams is depicted according to an illustrative embodiment. The process 300 includes receiving input video and graphics streams 302, determining a format of each of the video and graphics streams 304, determining whether each format of the video and graphics streams is compatible with a predetermined output format 306, converting the format of the streams that have formats incompatible to the predetermined output format, and combining all the streams in the predetermined output format.

At operation 302, the input graphical assets are received. In some embodiments, the input graphical assets may be in any source formats. The source formats are not limited to a format that is compatible to the predetermined output format or required output format of downstream display equipment (e.g., TV, computer). The input video and graphics streams can include multiple input source formats.

At operation 304, the video processing system determines a format of each of the input video and graphics streams according to one or more embodiments. In one or more embodiments, each video stream is associated with more than one format, or a combination of multiple formats. At operation 306, the video processing system determines for each input stream whether the format of the input is compatible with a predetermined output format. The compatible formats are not necessarily the same format; in some instances, multiple formats may be compatible with the output format. The predetermined output format is associated with a required format for display, in some embodiments. At operation 308, in response to determining the format of the input video and graphics streams is compatible with the predetermined output format, the video processing system combines the streams with the predetermined output format together. At operation 310, in response to determining the format of the input video and graphics streams is not compatible with the predetermined output format, a format converter of the video processing system converts the format of the input graphical assets/streams to a format that is compatible with the predetermined output format. Upon converting all incompatible formats of the input video and graphics streams, the video processing system combines all the streams that have the predetermined output format together to output a single stream for output/display.

The present disclosure has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present disclosure may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use various embodiments of these methods and systems, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A method, comprising:
   receiving a plurality of streams, each having a format belonging to one of a plurality of formats, each format of the plurality of formats comprising nonlinear space and light source parameters, each of the plurality of streams comprising at least one of video or graphics;
   for each of the plurality of streams, processing the stream by:
      determining the format of the stream,
      determining whether the format is compatible with a predetermined output format,
      responsive to determining the format is not compatible with the predetermined output format, converting the format to the predetermined output format,
      determining whether the light source parameters of the format are scene referred or display referred, and
      responsive to determining the light source parameters of the format are scene referred, applying an optical-to-optical transform function to the stream, or
      responsive to determining the light source parameters of the format are display referred, applying an inverse optical-to-optical transform function to the stream; and
   combining the processed streams into a single output stream in the predetermined output format.

2. The method of claim 1, wherein converting the format to the predetermined output format includes mapping colorspace and gamut of the format to a colorspace and gamut of the predetermined output format.

3. The method of claim 2, wherein the colorspace defines red, green, and blue primaries and white point.

4. The method of claim 3, wherein the white point is a temperature of white given equal amounts of the red, green, and blue primaries.

5. The method of claim 1, wherein converting the format to the predetermined output format includes changing brightness of the format to a brightness associated with the predetermined output format.

6. The method of claim 1, wherein the plurality of streams have at least one format that is different from the predetermined output format.

7. The method of claim 1, wherein the plurality of formats of the plurality of streams are independent of the predetermined output format.

8. The method of claim 1, wherein scene referred light source parameters are indicative of the light source parameters being received from an input device and wherein display referred light source parameters are indicative of the light source parameters being emitted by a display.

9. The method of claim 1, wherein the optical-to-optical transform function comprises multiplying an input gamma value by a scaling factor; and wherein the inverse optical-to-optical transform function comprises dividing an output gamma value by the scaling factor.

10. A video processing system, comprising:
    a format converter configured to convert each format belonging to one of a plurality of formats associated with a plurality of streams received by the video processing system to a predetermined output format, each format of the plurality of formats comprising nonlinear space and light source parameters, wherein each of the plurality of streams comprises at least one of video or graphics;
    the format converter further configured to determine whether the light source parameters of the format are scene referred or display referred, and responsive to determining the light source parameters of the format are scene referred, applying an optical-to-optical transform function to the stream, or responsive to determining the light source parameters of the format are display referred, applying an inverse optical-to-optical transform function to the stream; and
    a combiner configured to combine the plurality of streams in the predetermined output format.

11. The system of claim 10, wherein the format converter is configured to map colorspace and gamut of each format to a colorspace and gamut of the predetermined output format.

12. The system of claim 11, wherein the colorspace defines red, green, and blue primaries and white point.

13. The system of claim 12, wherein the white point is a temperature of white given equal amounts of the red, green, and blue primaries.

14. The system of claim 10, wherein the format converter is configured to change brightness of each format to a brightness associated with the predetermined output format.

15. The system of claim 10, wherein the plurality of formats are independent of the predetermined output format.

16. The video processing system of claim 10, wherein scene referred light source parameters are indicative of the light source parameters being received from an input device and wherein display referred light source parameters are indicative of the light source parameters being emitted by a display.

17. The video processing system of claim 10, wherein the optical-to-optical transform function comprises multiplying an input gamma value by a scaling factor; and wherein the inverse optical-to-optical transform function comprises dividing an output gamma value by the scaling factor.

18. One or more non-transitory computer-readable storage media having instructions stored thereon that, when executed by at least one circuit, cause the at least one circuit to perform operations comprising:
    receiving a plurality of streams, each having a format belonging to one of a plurality of formats, each format of the plurality of formats comprising nonlinear space and light source parameters, each of the plurality of streams comprising at least one of video or graphics;

for each of the plurality of streams, processing the stream by:

determining the format of the stream, determining whether the format is compatible with a predetermined output format, responsive to determining the format is not compatible with the predetermined output format, converting the format to the predetermined output format, determining whether the light source parameters of the format are scene referred or display referred, and responsive to determining the light source parameters of the format are scene referred, applying an optical-to-optical transform function to the stream, or responsive to determining the light source parameters of the format are display referred, applying an inverse optical-to-optical transform function to the stream; and combining the processed streams into a single output stream in the predetermined output format.

19. The one or more non-transitory computer-readable storage media of claim 18, wherein converting the format to the predetermined output format comprises mapping colorspace and gamut of the format to a colorspace and gamut of the predetermined output format.

20. The one or more non-transitory computer-readable storage media of claim 19, wherein the colorspace defines red, green, and blue primaries and white point.

21. The one or more non-transitory computer-readable storage media of claim 20, wherein the white point is a temperature of white given equal amounts of the red, green, and blue primaries.

22. The one or more non-transitory computer-readable storage media of claim 18, wherein converting the format to the predetermined output format includes changing brightness of the format to a brightness associated with the predetermined output format.

23. The one or more non-transitory computer-readable storage media of claim 18, wherein the plurality of formats include at least one format that is different from the predetermined output format.

24. The one or more non-transitory computer-readable storage media of claim 18, wherein the plurality of formats are independent of the predetermined output format.

25. The one or more non-transitory computer-readable storage media of claim 18, wherein scene referred light source parameters are indicative of the light source parameters being received from an input device and wherein display referred light source parameters are indicative of the light source parameters being emitted by a display.

26. The one or more non-transitory computer-readable storage media of claim 18, wherein the optical-to-optical transform function comprises multiplying an input gamma value by a scaling factor; and wherein the inverse optical-to-optical transform function comprises dividing an output gamma value by the scaling factor.

* * * * *